[11] 3,620,791

[72] Inventor Albert C. Krupnick
     Huntsville, Ala.
[21] Appl. No. 813,338
[22] Filed Apr. 3, 1969
[45] Patented Nov. 16, 1971
[73] Assignee The United States of America as represented by the Administrator of the National Aeronautics and Space Administration

[54] INORGANIC THERMAL CONTROL COATINGS
     7 Claims, No Drawings
[52] U.S. Cl. .................................................. 106/288 B,
                                              106/84, 106/286
[51] Int. Cl. ................................................... C08h 17/02
[50] Field of Search ........................................... 106/84, 288
                                              B, 286, DIG. 3

[56] References Cited
UNITED STATES PATENTS

| | | | |
|---|---|---|---|
| 2,449,346 | 9/1948 | Vannoy | 106/84 |
| 2,906,649 | 5/1959 | Keuth et al. | 106/84 |
| 3,001,571 | 9/1961 | Hatch | 106/DIG. 3 |
| 3,442,671 | 5/1969 | Rolland et al. | 106/84 |

Primary Examiner—James E. Poer
Attorneys—L. D. Wofford, Jr., J. H. Beumer and G. T. McCoy ABSTRACT: Inorganic coating compositions are based on a binder obtained by gelling a suspension of synthetic mica or sodium magnesium fluorolithosilicate mineral with a solution of a soluble metal silicate or sulfate. Pigments and other additives are included to provide the desired optical properties. For solar reflector coatings zinc oxide pigment and hollow glass microspheres are employed.

INORGANIC THERMAL CONTROL COATINGS

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

This invention relates to coating compositions and more particularly to thermal control coatings for spacecraft.

Thermal control coatings are employed to assist in maintaining the temperature of space vehicles and equipment within prescribed operating limits. The optical properties of such coatings, and in particular the solar absorptance ($\alpha$) and thermal emittance ($\epsilon$) are adjusted in accordance with the thermal requirements of the surface to be coated. For example, coatings used as solar reflectors require a low absorptance and a high emittance, that is, a low $\alpha/\epsilon$ ratio. Other applications involve requirements for varying degrees of absorption or reflection of solar energy in the ultraviolet, visible, infrared or other wavelength ranges.

In addition to providing the desired optical characteristics, thermal control coatings for space vehicles must exhibit favorable mechanical properties including good adhesion, durability and resistance to cracking, along with resistance to degradation upon exposure to the vacuum radiation environment of space. Compatibility with cryogenic liquids such as liquid hydrogen or liquid helium is also required for some applications.

Various paintlike compositions have been developed previously for use as thermal control coatings, but most of the existing compositions exhibit serious deficiencies or disadvantages. Pigmented compositions utilizing an organic polymeric binder, with few exceptions, cannot be used in space because of the severe degradation which occurs when polymeric materials are exposed to solar radiation in vacuum. Some types of silicone polymers have shown improved radiation stability, but they are subject to decomposition upon exposure to chemical species included in the exhaust plumes evolved by attitude control rockets. Inorganic compositions employing an alkali metal silicate binder show excellent stability in the space environment, but their mechanical properties leave much to be desired and, in some cases, preclude their use. Silicate binders tend to be slightly water soluble and therefore subject to degradation in the presence of moisture. In addition these compositions have a high degree of porosity and are very difficult to clean. Silicate binders cannot withstand the mechanical stresses imposed by thermal cycling from ambient to cryogenic temperatures so that they are unsuitable for uses involving contact with liquid hydrogen or liquid helium.

Pigments as well as binders are subject to varying degrees of degradation in space, with even the best pigments such as zinc oxide undergoing some increase in solar absorptance upon exposure to ultraviolet and infrared radiation in vacuum. Coating stability would be improved by providing compositions in which a minimum proportion of pigment is used. Furthermore, pigments have a high density, and measures taken to reduce the amount of pigment provide a further advantage in that the weight of the coating would be decreased. Weight savings of course are always desirable for space applications.

SUMMARY OF THE INVENTION

In the present invention coating compositions are based on a binder comprising a suspension of synthetic mica or sodium magnesium-fluorolithosilicate mineral gelled with a suitable cation-containing solution, which can be a solution of a soluble alkali metal silicate or a metal sulfate salt. Zinc oxide or other pigment is normally added to the composition, depending on the optical properties desired. The amount of pigment which would otherwise be required can be reduced by using reflective glass microspheres along with the pigment. These compositions can be "tailored" extensively for a variety of coating applications, and they exhibit excellent long-term stability in the space environment. The coatings obtained by using these compositions show highly favorable mechanical properties, including good substrate adhesion, durability and resistance to cracking, along with mechanical stability when in contact with liquid hydrogen or liquid helium.

It is therefore an object of this invention to provide improved inorganic thermal control coatings.

Another object is to provide thermal control coatings which exhibit good mechanical properties and stability in the space environment.

Yet another object is to provide an inorganic binder component suitable for use in thermal control coatings.

Still another object is to provide an inorganic binder which is resistant to the mechanical stresses imparted to it during thermal cycling between ambient and cryogenic temperatures.

Other objects and advantages of the invention will be apparent from the following detailed description.

DESCRIPTION OF THE PREFERRED EMBODIMENT

The invention in its broadest aspect is concerned with the provision of a binder which can form the basis for a wide variety of coatings by addition of selected pigments and other components. Gelation of synthetic mica or sodium-magnesium-fluorolithosilicate mineral in finely divided aqueous suspension by addition of a specified cation-containing solution produces a hard, durable material highly resistant to solar radiation and ideally suited for binder use. Although the invention is not to be understood as limited to a particular theory, the formation of this material is believed to result from an exchange reaction between metal cations such as lithium or sodium in the mica or mineral component with cations in the gelant solution.

The principal component of the binder is a finely divided aqueous suspension of a reactive synthetic mica or a mineral of the trioctahedral montmorillonite type. These materials are characterized by their physical form of extremely thin platelets and their excellent capability for film formation in aqueous suspension and by their high degree of chemical reactivity, owing to the presence of low-atomic-number metals and fluorine. Synthetic micas which can be used are exemplified by the formula $$MMg_2LiSi_4O_{10}F_2$$

where M is sodium or lithium. Material of this type is obtained by chemical modification of naturally occurring micas such as phlogopite. Most naturally occurring micas are not suitable without chemical modification, although they have the same crystal structure as the synthetic mica given above. The relatively high content of aluminum or potassium atoms in natural micas results in a low reactivity and poor film forming properties, requiring that these elements be at least partially replaced by the more reactive lithium. In addition, hydroxy groups in the naturally occurring material are replaced by fluorine atoms. Synthetic mica with the formula given above is available commercially under the trade name "Burnil Microplates" in the form of irregular platelets 20 and 100 angstroms thick, with their diameters greater than  100 times the thickness.

Minerals of the trioctahedral montmonorillonite type which can be employed are exemplified by the naturally occuring material hectorite, a sodium-magnesium-fluorolithosilicate, having the formula $MMg_3LiSi_4O_{12}H_2F_2$ where M is sodium or lithium. This naturally occurring mineral is refined or purified before use in the invention, but no chemical conversion is required. The presence of lithium and fluorine and the low aluminum content contribute to the necessary reactivity for this material, in contrast to most naturally occurring micas. Refined hectorite is available commercially under the trade name "Macaloid" with a typical analysis for this material in weight percent being as follows: $SiO_2$, 51.89; $MgO$, 22.07; $Li_2O$, 1.21; $Na_2O$, 3.08; $CaO$, 6.46; $Fe_2O_3$, 0.32; $Al_2O_3$, 0.77 and F, 2.07. The ultimate particle size is colloidal (less than 1 micron), and its surface area 600 square meters per gram.

The synthetic mica or fluorolithosilicate is employed in the form of an aqueous suspension, having a concentration such as to allow mixing with the other components and subsequent application as a coating, a concentration of about 4 weight percent being suitable in most cases, although concentrations from about 1.5 to 25 weight percent can be used. These materials form a thixotropic slurry in water, and higher concentrations may cause difficulty in attaining a homogeneous mixture and result in a marked reduction in film forming properties.

An aqueous solution containing metal cations in the form of a soluble metal silicate or sulfate is mixed with the synthetic mica or fluorolithosilicate suspension in an amount sufficient to provide the desired properties in the cured binder or coating. The metal cation source can be a soluble alkali metal silicate such as sodium, lithium or potassium silicate, or aluminum silicate (mullite). In the case of alkali metal silicates, the properties and solubility vary with the ratio of alkali metal oxide to silica therein, but any water soluble form can be used. A silicate concentration of about 20 to 25 weight percent in the gelant solution is preferred.

An aqueous solution of certain metal sulfates can also be used as the gelant. Sulfates of alkali metals including sodium, lithium and potassium and of alkaline earth metals including calcium, magnesium and the like, as well as aluminum sulfate are suitable for this purpose. A sulfate concentration of 2.0 to 2.5 weight percent gives best results. Binders gelled with sulfate solutions show some advantages over silicate-gelled binders, for example, in the hiding power of the product coating, but silicate-gelled binders show better mechanical properties.

The mechanical properties of the binder can be controlled by varying the relative amounts of synthetic mica or fluorolithosilicate and gelant solution. For binders gelled with soluble silicate solutions, about 15 to 30 weight percent gelant relative to the total dry solids weight of binder components can be used. At lower proportions mechanical strength and durability are reduced, and at proportions over 30 percent the binder or product coating becomes brittle. For metal sulfate solutions a gelant proportion of 0.25 to 0.32 weight percent of binder components can be used. As is the case for the silicate gelant, the binder becomes harder with increasing amounts of sulfate solution gelant.

The mixture obtained by combining the synthetic mica or fluorolithosilicate suspension and its gelant solution can be used without any other additives for some coating applications. Such a coating is highly durable and protective, but its optical properties, for example, a solar absorptance of 0.56 for a typical mixture, limit its use in unpigmented form.

For most applications, therefore, pigments or other additives will be employed to impart the desired optical properties. The binder prepared as described above is broadly compatible with conventional pigment materials, and in particular oxide pigments such as zinc oxide, titanium oxide, antimony trioxide, zirconium oxide and the like. For solar reflector type thermal control coatings, a pigment having maximum stability to solar radiation in vacuum is preferred, and zinc oxide and zirconium oxide are the most suitable in this regard. A pigment volume concentration of about 25 to 48 percent can be used, and best results with regard to optical properties are obtained at a concentration of 38 to 42 percent pigment.

For reflective coatings all or part of the pigment component can be replaced by solid or hollow glass microspheres, such as are available commercially under the designation "Microballoons." Minimum particle size microspheres are preferred, and in particular those having a diameter less than 5 microns, although commercially available microspheres which have a diameter of 35 to 45 microns can also be used. Glass microspheres exhibit a high degree of stability in the space environment and excellent reflective properties so that they are ideally suited for thermal control coating applications. In addition coating weight is reduced since glass microspheres have a much lower density than oxide pigments.

For best results the glass microspheres are used in combination with a pigment such as zinc oxide, with the much smaller pigment particles being interdisposed between the glass particles in the coating to provide maximum 3 power. A preferred pigment—glass microsphere combination is 10 to 18.6 volume percent (of the total of these two components) pigment and 0.16 balance glass microsphere.

The optical properties of coatings prepared according to this invention can be varied widely by selection of an appropriate pigment. For highly absorptive coatings a black pigment such as carbon black, spectrum analysis No. 3 can be used. Other inorganic pigments covering the full color spectrum normal to standard paint formulations can be employed with absorptivity ranging between 0.16 and 0.98.

Coating compositions incorporating the above components are readily prepared by conventional mixing methods such as ball milling, with a mixing period of 3 to 6 hours being sufficient to obtain a homogeneous mixture under typical conditions. The resulting mixture can be applied to a substrate by means such as spraying in the same manner as for conventional paints. After application the coating is tack-free, and it will dry in air at room temperature. However, a preferred curing cycle is 24 hours at room temperature, 8 hours at 170° F. and 16 hours at 250° F., the elevated temperatures being used to ensure complete curing and hardening.

More than one coat can be applied as needed to build up the thickness of the coating. In the case of solar reflector coatings a thickness of 5 to 8 mils provides maximum reflection of radiation.

The invention is further illustrated by the following specific examples:

EXAMPLE I

A coating composition based on silicate-gelled synthetic mica was prepared by combining the following components in the amounts indicated:

| | |
|---|---|
| synthetic mica (Burnil Microplates) in 4 weight percent aqueous suspension | 652.5 grams |
| potassium silicate solution (38 weight percent solids content; silica to potassium oxide weight ratio 2.1) | 228.0 grams |
| zinc oxide pigment | 150.0 grams |
| glass microballoons (35 to 45 microns diameter) | 52.5 grams |

These components were initially mixed in a ball mill for 2 hours, and, after addition of 200 cubic centimeters of distilled water, were then mixed by ball-milling for an additional 4 hours.

The resulting mixture was pressure sprayed (35 p.s.i.g.) onto a cleaned and lightly grit blasted (100 micron grit particles at 40 p.s.i.g.) metal substrate to a thickness of 6 to 8 mils. The coating was allowed to dry at room temperature for 24 hours and was then cured by heating at 170° F. for 8 hours and 250° F. for 16 hours. The cured coating was determined to have a solar absorptivity of 0.16 and an emissivity of 0.97. The coated specimen was exposed to ultraviolet radiation for 1000 equivalent sun hours at a vacuum of $5 \times 10^{-8}$ torr, and the increase in solar absorbtivity from this exposure was found to be less than 0.01 percent. Exposure of the coating to electron and proton radiation at a flux of $10^{13}$ electrons or protons per square centimeter at 1 mev energy level at $5 \times 10^{-7}$ torr resulted in solar absorbtivity increases of 0.00 and 0.01, respectively. These tests demonstrate the exceptionally good resistance of the coating to degradation of optical properties upon exposure to radiation in vacuum.

EXAMPLE II

A coating composition based on silicate-gelled fluorolithosilicate mineral (hectorite) was prepared by combining the following components in the amounts indicated:

| | |
|---|---|
| fluorolithosilicate (refined hectorite available under the trade name "Macloid" in 4 weight percent aqueous suspension) | 625.5 g. |
| potassium silicate (38 weight percent solids content; silica to potassium oxide weight ratio 2:1) | 228.0 g. |
| zinc oxide pigment | 150.0 g. |
| glass microballoons (35 to 45 microns diameter) | 52.8 g. |

These components were mixed and the mixture applied to a metal substrate and cured according to the procedure of example I. The resulting coated specimen showed essentially the same properties as specimens coated with the composition of example I.

EXAMPLE III

Coating compositions cured with a sulfate solution were prepared by combining the following components in the amounts indicated:

| | |
|---|---|
| synthetic mica (Burmil Microplates) or fluorolithosilicate (Macloid) in 4 weight percent aqueous suspension | 625.5 g. |
| calcium sulfate (½ hydrate) in 0.3 weight Percent aqueous solution | 241.7 g. |
| zinc oxide | 60.0 g. |
| glass microballoons (35 to 45 microns diameter) | 52.8 g. |

These components were mixed and the mixture sprayed on a metal substrate according to the procedure of example I. Curing was carried out by allowing the coating to dry at room temperature for 16 hours, and then heating at 170° F. for 12 hours and 275° F. for 16 hours. The properties of the resulting coated specimens were essentially the same as obtained in example I.

EXAMPLE IV

Coatings containing a wide variety of color pigments (varying shades of blues, greens, browns, yellows, grays, reds, etc.) were prepared by substituting commercially available inorganic masstone pigments for a portion of the zinc oxide and glass microballoons in the composition of example I. A twenty gram portion of the color pigments in combination with zinc oxide or titanium oxide was used in each case at a ratio of 4:1 or 1:1 white pigment to color pigment, depending on the color hue desired. The milling and curing cycles used were the same as for example I. Solar absorptivity values from 0.34 to 0.98 and emissivity values from 0.88 and to 0.98 were obtained.

Thermal cycling tests have been conducted using specimens prepared by the procedure of example I. The specimens were subjected to repeated cycles of temperatures from +450° C. to liquid hydrogen temperature (−252° C.). No damage to physical or optical properties was observed. In addition the specimens were demonstrated to be compatible with liquid oxygen and nonflammable in air or pure oxygen. Specimens were also shown not to undergo significant off-gassing in a vacuum $1 \times 10^{-7E}$ mm. Hg.

It is to be understood that the above examples are merely illustrative and that they are not to be considered as limiting the scope of the invention. Numerous modifications, variations and substitutions can be made in the ingredients used, and in particular in the pigments employed, as well as in the procedure for applying and curing of coating compositions embodying the invention.

What is claimed is:

1. A curable coating composition consisting essentially of a homogeneous mixture of the following ingredients:
   a. a finely divided aqueous suspension of a micaceous material selected from the group consisting of a synthetic mica having the formula $MMg_2LiSi_4O_{10}F_2$ where M is sodium or lithium and a fluorolithosilicate having the formula $MMg_2LiSi_4O_{12}H_2F_2$ where M is sodium or lithium;
   b. an aqueous solution containing dissolved therein a metal sulfate selected from the group consisting of soluble alkali metal sulfates, alkaline earth sulfates and aluminum sulfate at a proportion of 0.25 to 0.32 weight percent of the solids content of said suspension; and
   c. at least one reflectance-promoting additive selected from the group consisting of inorganic pigments and glass microballoons.

2. The composition of claim 1 wherein said soluble metal sulfate is calcium sulfate.

3. The composition of claim 1 wherein said reflectance-promoting additive is provided at a proportion of 25 to 48 pigment volume concentration.

4. The composition of claim 3 wherein 10 to 18.6 volume percent of said additive is a pigment and the balance glass microballoons.

5. The composition of claim 4 wherein said pigment is zinc oxide.

6. The composition of claim 5 wherein the concentration of metal sulfate in said gelant solution is about 2 to 2.5 weight percent.

7. A curable thermal control coating for spacecraft consisting essentially of a homogeneous mixture of the following ingredients, in parts by weight:
   a. finely divided 4 weight percent aqueous suspension of a micaceous material selected from the group consisting of a synthetic mica having the formula $MMg_2LiSi_4O_{10}F_2$ where M is sodium or lithium and a fluorolithosilicate having the formula $MMg_2LiSi_4O_{12}H_2F_2$ where M is

| | |
|---|---|
| a. sodium or lithium | 652.5 |
| b. calcium sulfate (½ hydrate) in 0.3 weight percent aqueous solution | 241.7 |
| c. zinc oxide | 60.0 |
| d. glass microballoons (35 to 45 microns diameter) | 52.8. |

* * * * *